United States Patent
Yamajo et al.

(10) Patent No.: US 10,877,357 B2
(45) Date of Patent: Dec. 29, 2020

(54) SIGNAL PROCESSING APPARATUS AND IMAGING APPARATUS

(71) Applicant: Sony Corporation, Tokyo (JP)

(72) Inventors: Hiroaki Yamajo, Kanagawa (JP); Masayuki Tachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 16/080,334

(22) PCT Filed: Jan. 18, 2017

(86) PCT No.: PCT/JP2017/001527
§ 371 (c)(1),
(2) Date: Aug. 28, 2018

(87) PCT Pub. No.: WO2017/149969
PCT Pub. Date: Sep. 8, 2017

(65) Prior Publication Data
US 2019/0064640 A1 Feb. 28, 2019

(30) Foreign Application Priority Data

Mar. 4, 2016 (JP) ................................. 2016-041718

(51) Int. Cl.
*G03B 19/02* (2006.01)
*G03B 19/22* (2006.01)
(Continued)

(52) U.S. Cl.
CPC ............. *G03B 19/02* (2013.01); *G03B 19/22* (2013.01); *G06T 3/4015* (2013.01);
(Continued)

(58) Field of Classification Search
CPC .... G03B 19/22; H04N 5/23238; H04N 5/232; H04N 13/111; H04N 5/2258; H04N 5/23296; H04N 5/357; H04N 5/23229
See application file for complete search history.

(56) References Cited

U.S. PATENT DOCUMENTS

2014/0049657 A1* 2/2014 Fukunishi ................. G06T 7/32
 348/208.4
2014/0340543 A1* 11/2014 Nakada .............. H04N 5/23229
 348/239

(Continued)

FOREIGN PATENT DOCUMENTS

CN 101998127 A 3/2011
CN 102934447 A 2/2013
(Continued)

OTHER PUBLICATIONS

International Search Report and English translation thereof dated Apr. 11, 2017 in connection with International Application No. PCT/JP2017/001527.

(Continued)

*Primary Examiner* — Christopher K Peterson
(74) *Attorney, Agent, or Firm* — Wolf, Greenfield & Sacks, P.C.

(57) ABSTRACT

A signal processing apparatus according to an embodiment of the present disclosure includes a positioner and a synthesizer. The positioner generates, on the basis of two pieces of RAW data different in angle of view from each other, positioning data of the two pieces of RAW data. The synthesizer synthesizes the two pieces of RAW data with each other on the basis of the positioning data generated by the positioner.

18 Claims, 12 Drawing Sheets

(51) Int. Cl.
| | |
|---|---|
| H04N 5/232 | (2006.01) |
| H04N 13/111 | (2018.01) |
| G06T 3/40 | (2006.01) |
| H04N 5/225 | (2006.01) |
| H04N 5/357 | (2011.01) |
| H04N 9/09 | (2006.01) |
| G06T 11/60 | (2006.01) |
| H04N 5/265 | (2006.01) |

(52) U.S. Cl.
CPC ........... *H04N 5/2258* (2013.01); *H04N 5/232* (2013.01); *H04N 5/23238* (2013.01); *H04N 5/23296* (2013.01); *H04N 5/357* (2013.01); *H04N 9/09* (2013.01); *H04N 13/111* (2018.05)

(56) References Cited

U.S. PATENT DOCUMENTS

| | | | | |
|---|---|---|---|---|
| 2015/0244995 | A1* | 8/2015 | Sekiguchi | H04N 9/045 348/164 |
| 2015/0373234 | A1* | 12/2015 | Gohshi | H04N 5/208 348/606 |
| 2016/0028949 | A1* | 1/2016 | Lee | H04N 5/06 348/218.1 |

FOREIGN PATENT DOCUMENTS

| | | |
|---|---|---|
| CN | 103518368 A | 1/2014 |
| JP | 2002-112007 A | 4/2002 |
| JP | 2003-134375 A | 5/2003 |
| JP | 2006-197243 A | 7/2006 |
| JP | 2009-169597 A | 7/2009 |
| JP | 2014-225843 A | 12/2014 |

OTHER PUBLICATIONS

International Written Opinion dated Apr. 11, 2017 in connection with International Application No. PCT/JP2017/001527, and English translation thereof.

International Preliminary Report on Patentability dated Sep. 13, 2018 in connection with International Application No. PCT/JP2017/001527, and English translation thereof.

Chinese Office Action dated Mar. 19, 2020 in connection with Chinese Application No. 201780010035.5, and English translation thereof.

* cited by examiner

[ FIG. 1 ]
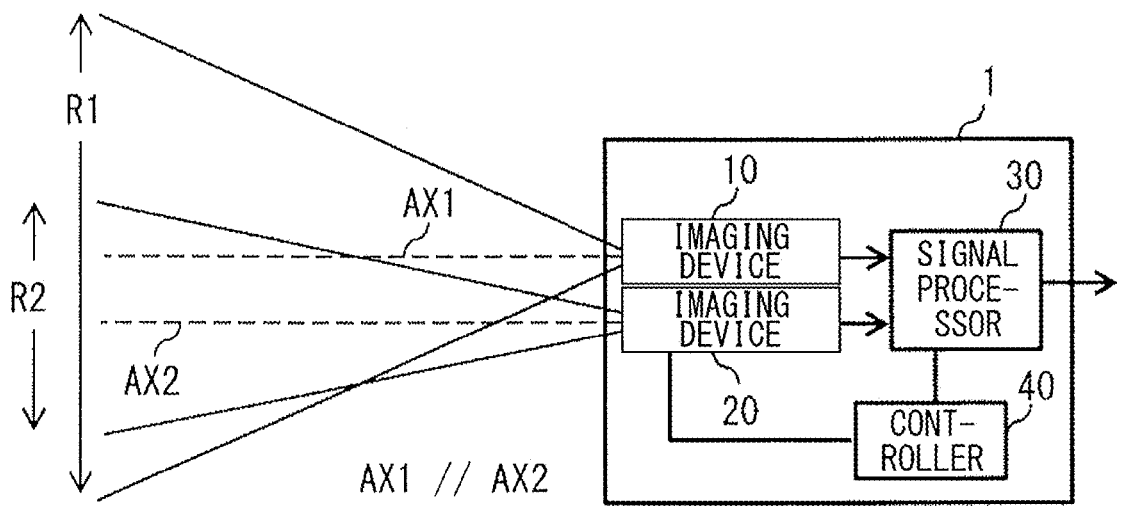
[ FIG. 2 ]
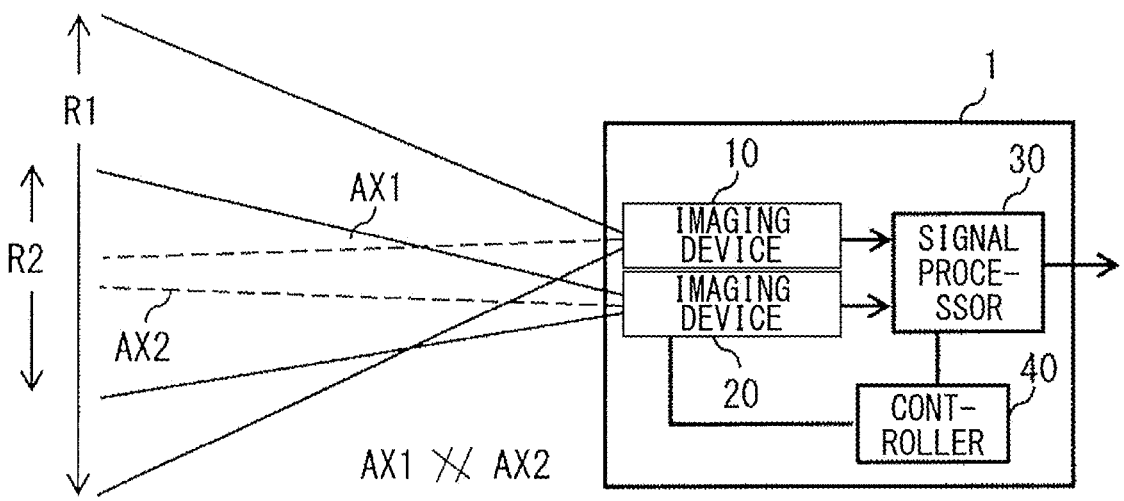

[ FIG.3 ]
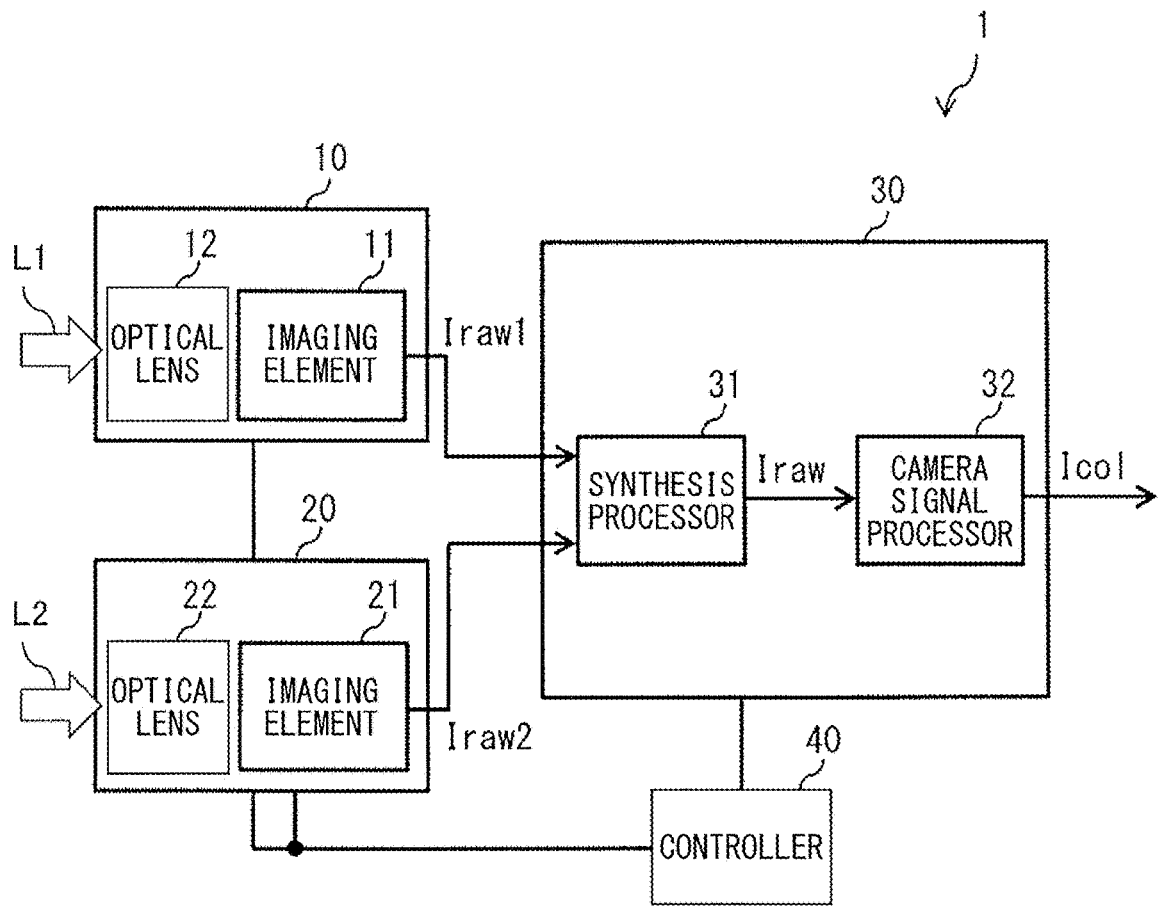
[ FIG.4 ]
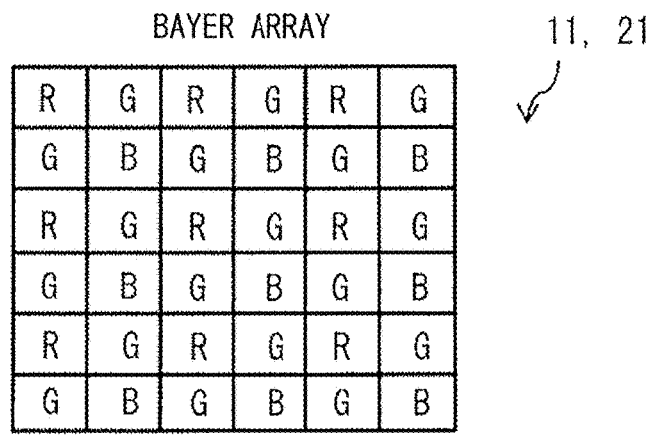

[FIG. 5]
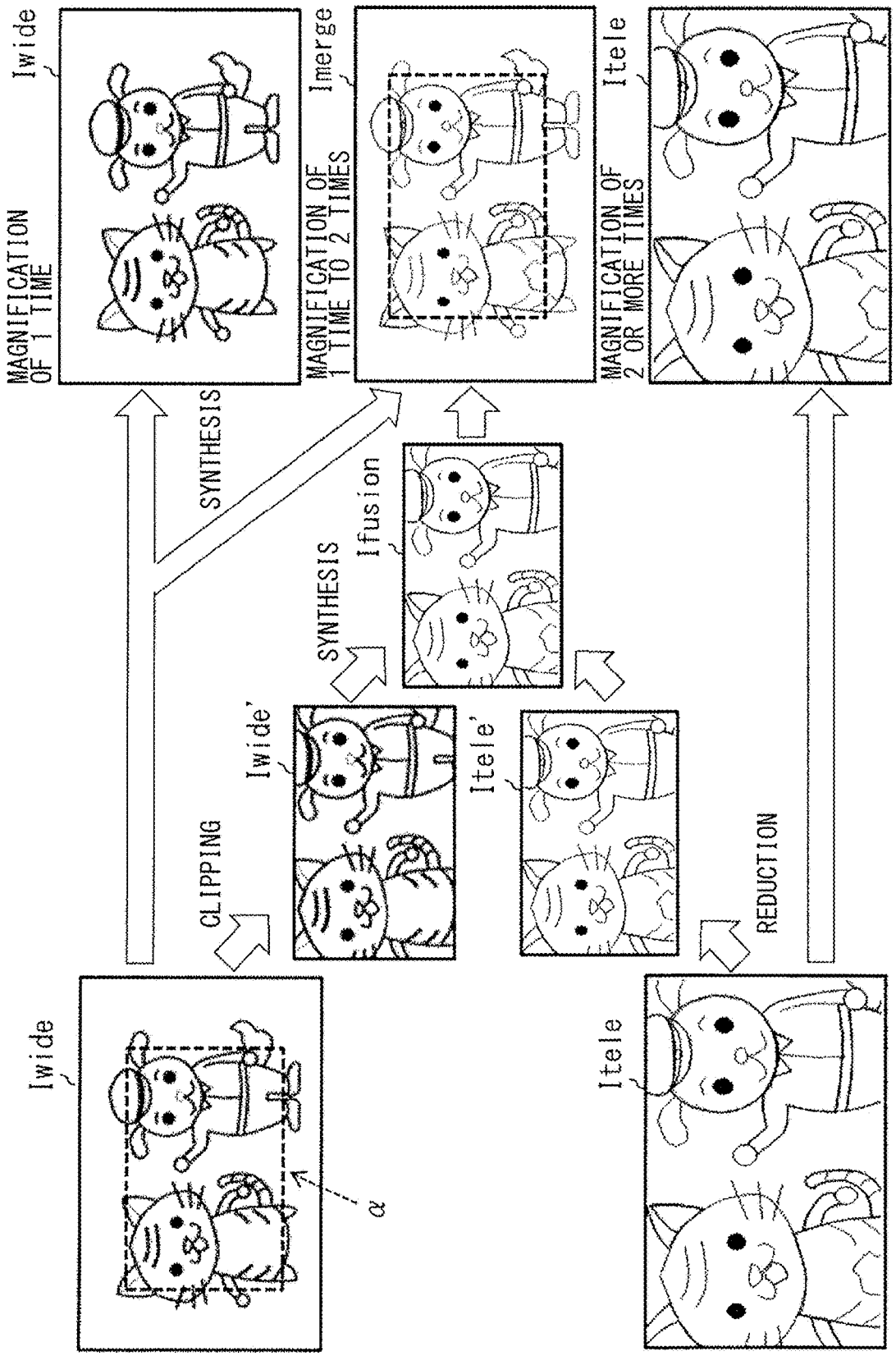

[FIG. 6]
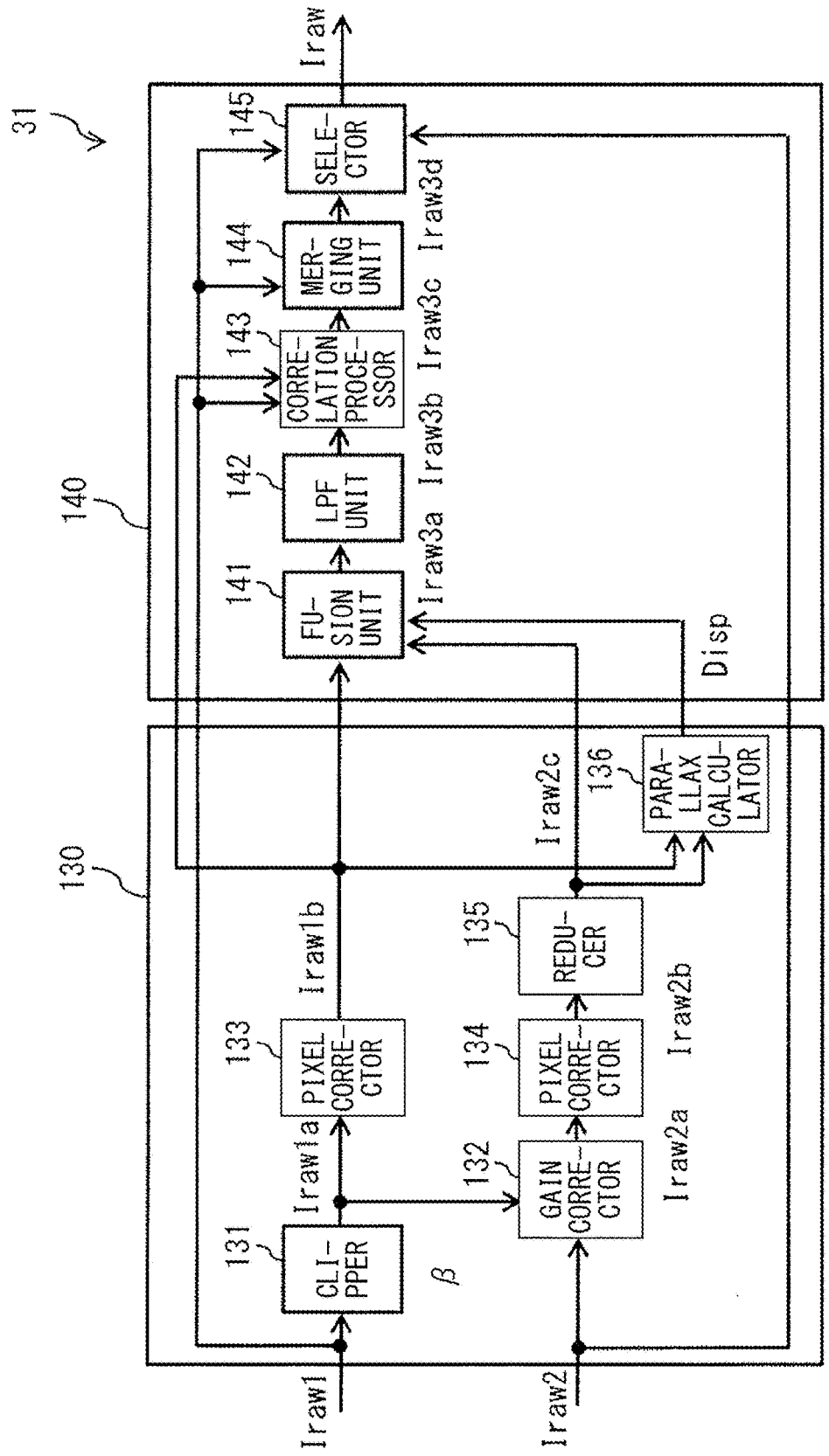

[ FIG. 7 ]
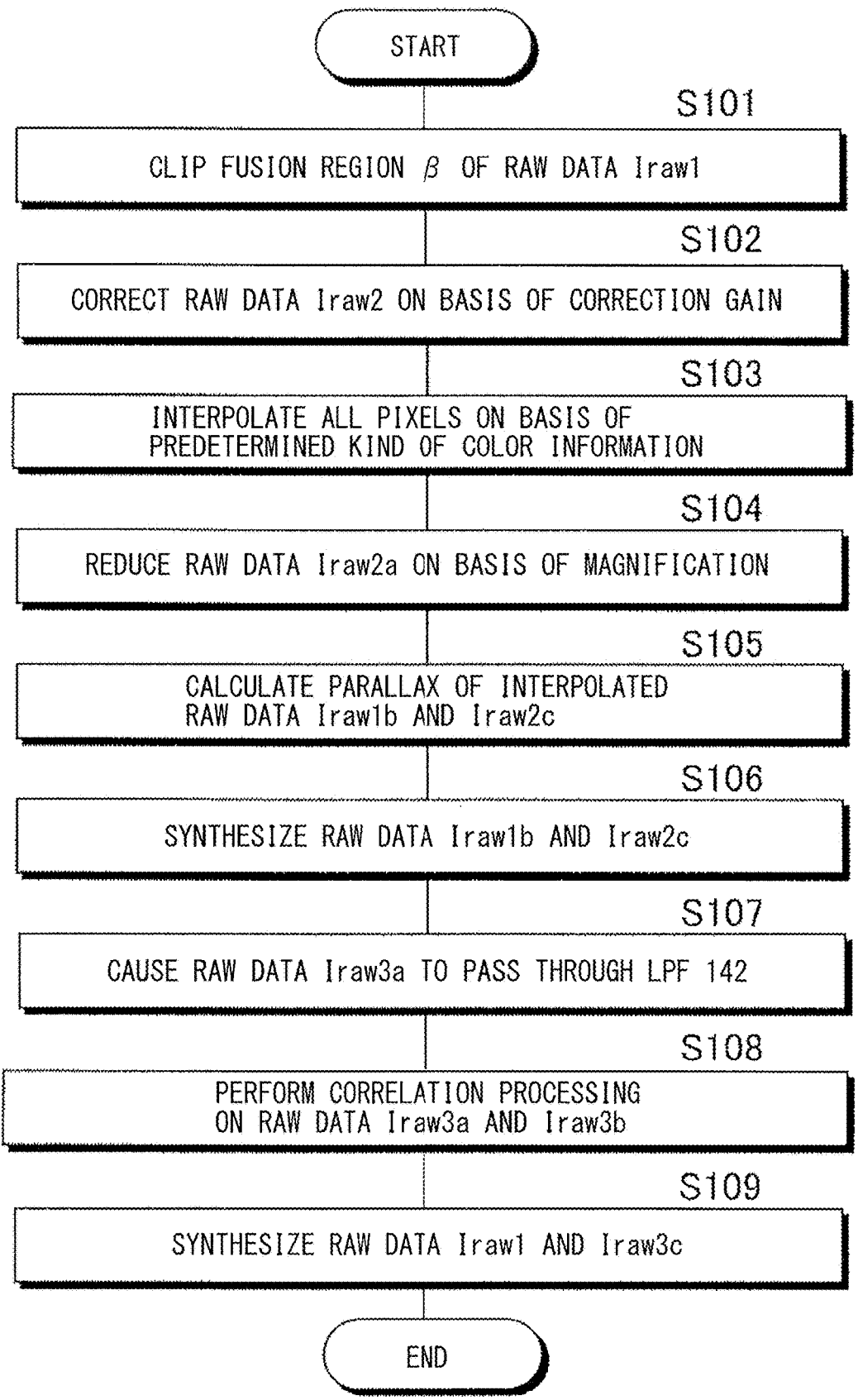

[ FIG. 8 ]
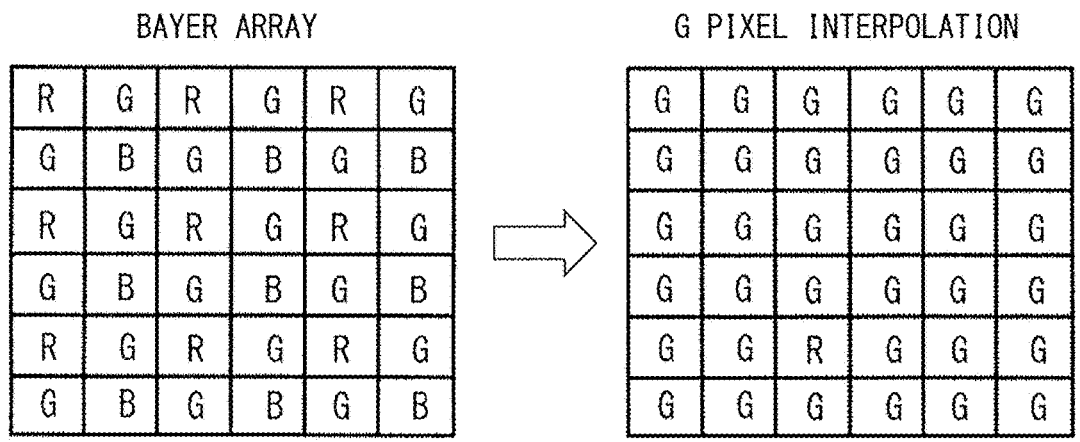
[ FIG. 9 ]
INTERPOLATION FILTER F IN CASE WHERE CENTER PIXEL IS G PIXEL
| 0 | 0 | 0 |
|---|---|---|
| 0 | 1 | 0 |
| 0 | 0 | 0 |
[ FIG. 10 ]
INTERPOLATION FILTER F IN CASE WHERE CENTER PIXEL IS R PIXEL OR B PIXEL
| 0 | 1 | 0 |
|---|---|---|
| 1 | 0 | 1 |
| 0 | 1 | 0 |

[ FIG. 11 ]
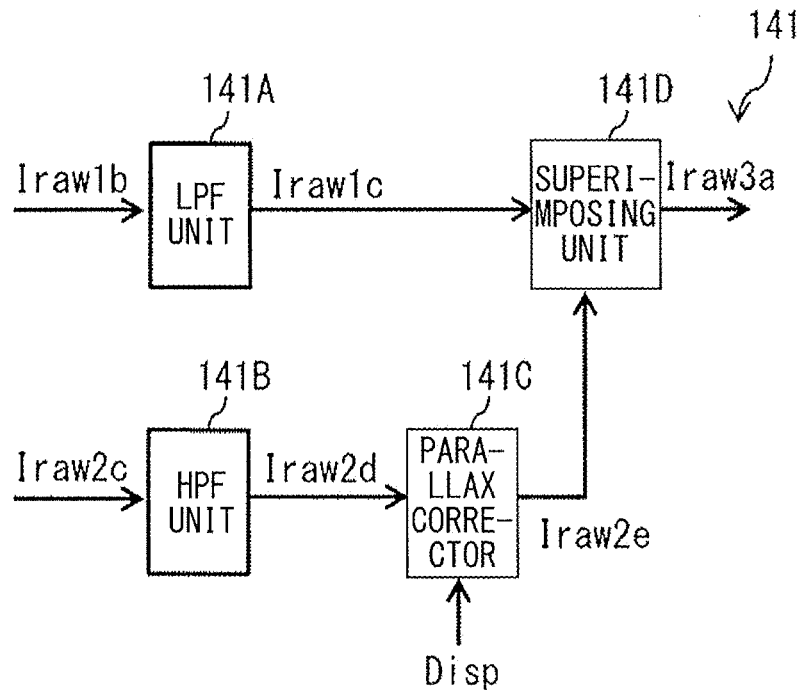
[ FIG. 12 ]
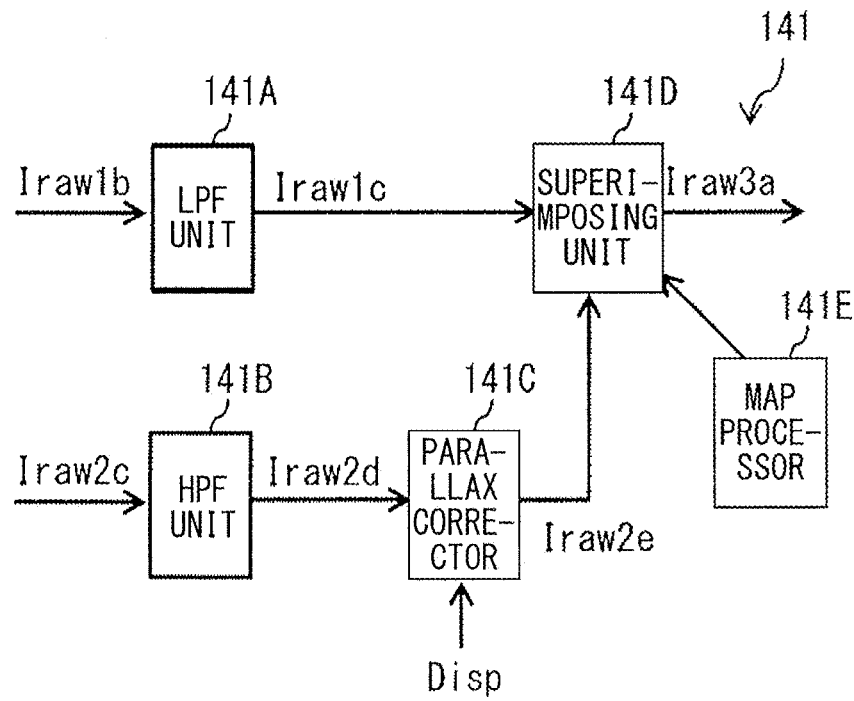

[FIG. 13]
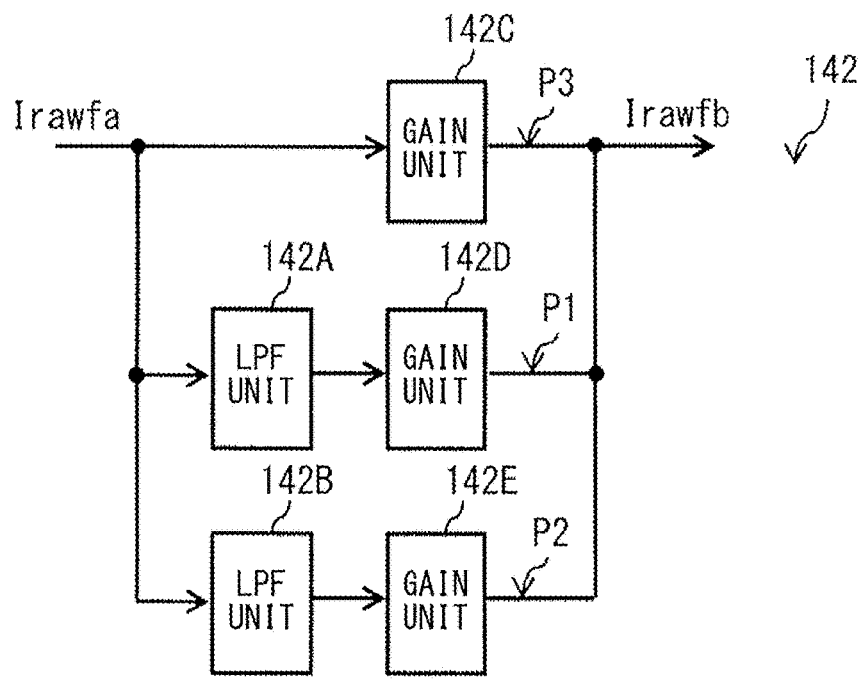
[FIG. 14]
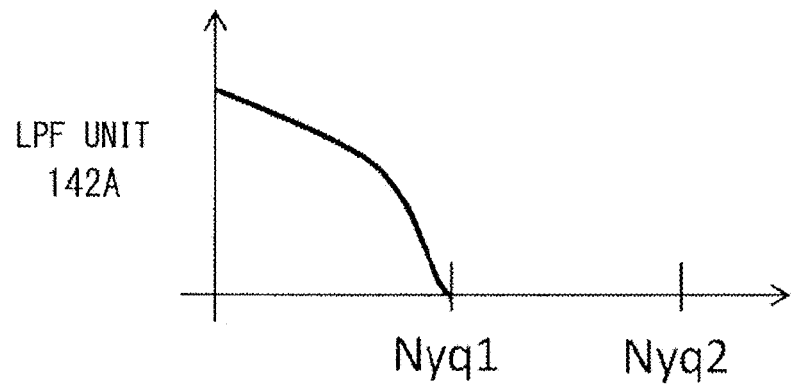
[FIG. 15]
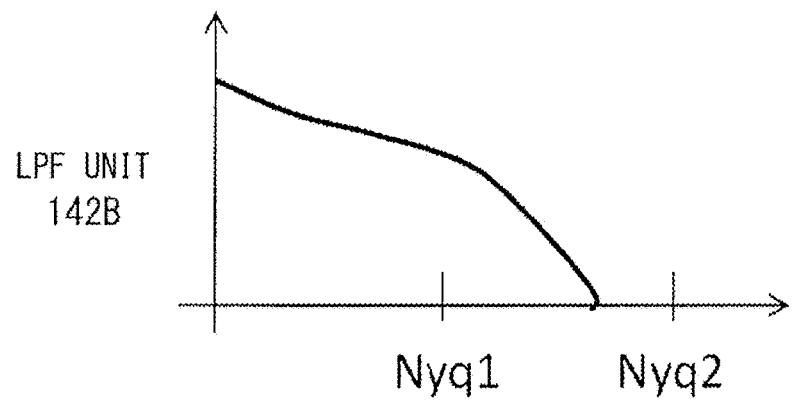

[ FIG. 16A ]

$$\begin{array}{cc} \text{G INTERPOLATED DATA} & \text{COLOR DIFFERENCE COMPONENT} \end{array}$$

$$I_{raw3c} = I_{raw3b} + I_{raw1} - I_{raw1b}$$

$$R_{raw3c} = G_{raw3b} + R_{raw1} - G_{raw1b}$$
$$G_{raw3c} = G_{raw3b} + G_{raw1} - G_{raw1b}$$
$$B_{raw3c} = G_{raw3b} + B_{raw1} - G_{raw1b}$$

[ FIG. 16B ]

$$\begin{array}{cc} \text{G INTERPOLATED DATA} & \text{COLOR DIFFERENCE COMPONENT} \end{array}$$

$$I_{raw3c} = I_{raw3b} \times I_{raw1} / I_{raw1b}$$

$$R_{raw3c} = G_{raw3b} \times R_{raw1} / G_{raw1b}$$
$$G_{raw3c} = G_{raw3b} \times G_{raw1} / G_{raw1b}$$
$$B_{raw3c} = G_{raw3b} \times B_{raw1} / G_{raw1b}$$

[ FIG. 17 ]
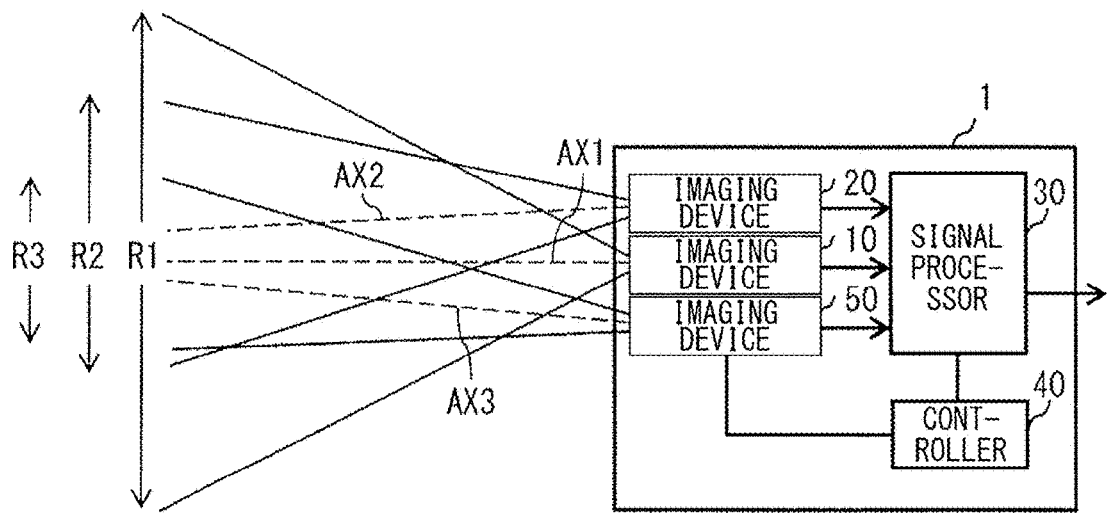
[ FIG. 18 ]
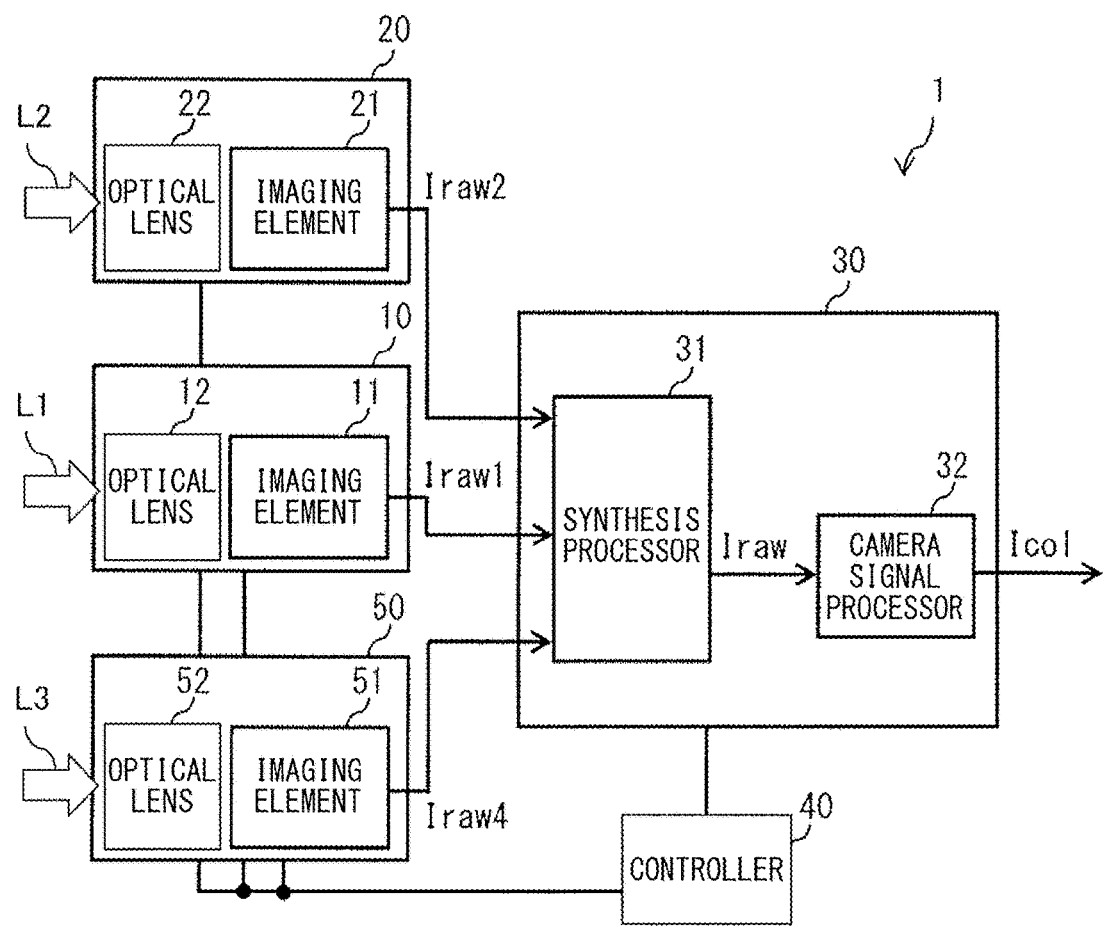

[FIG. 19]
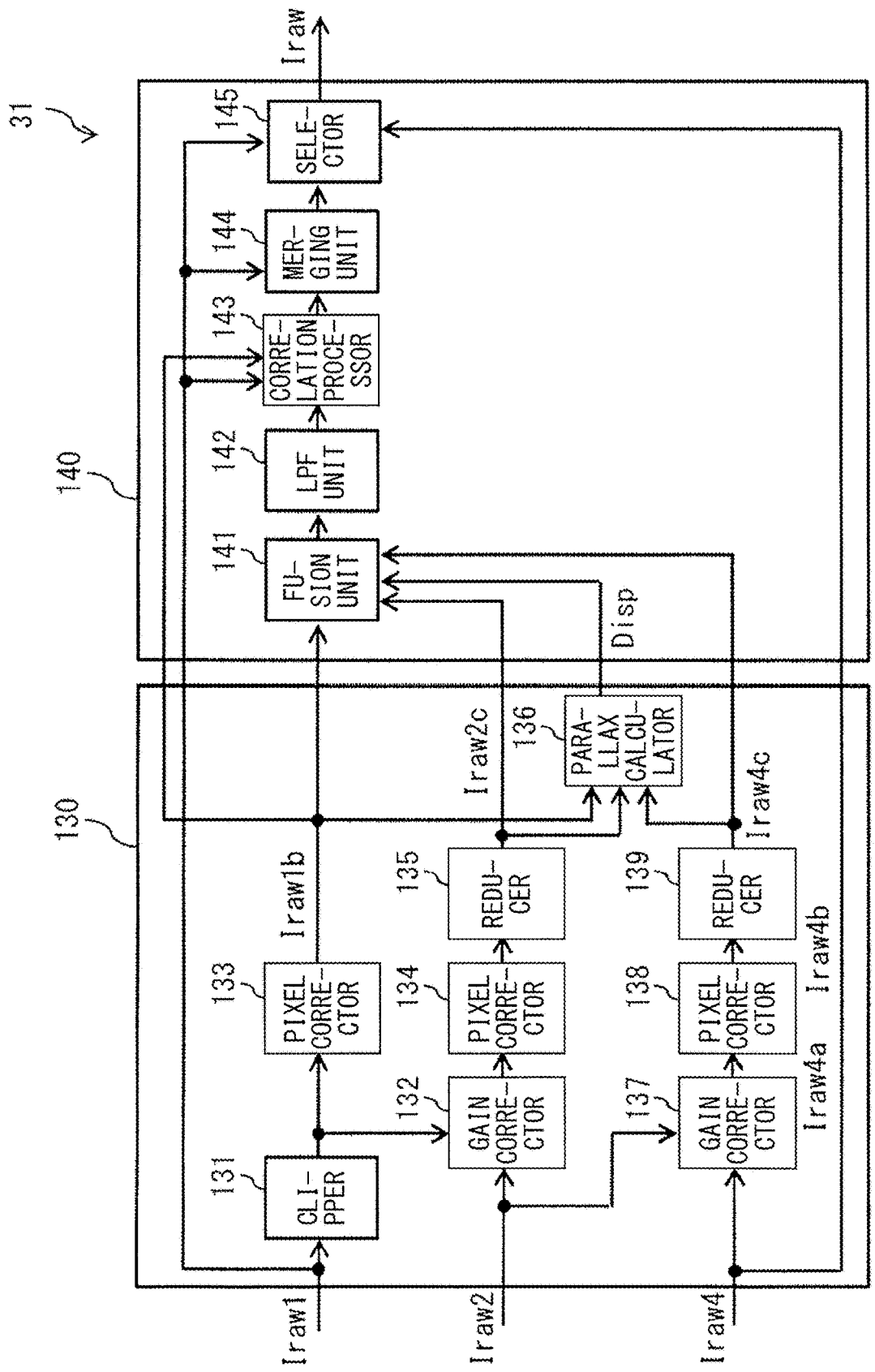

[ FIG. 20 ]
EXISTING TECHNIQUE
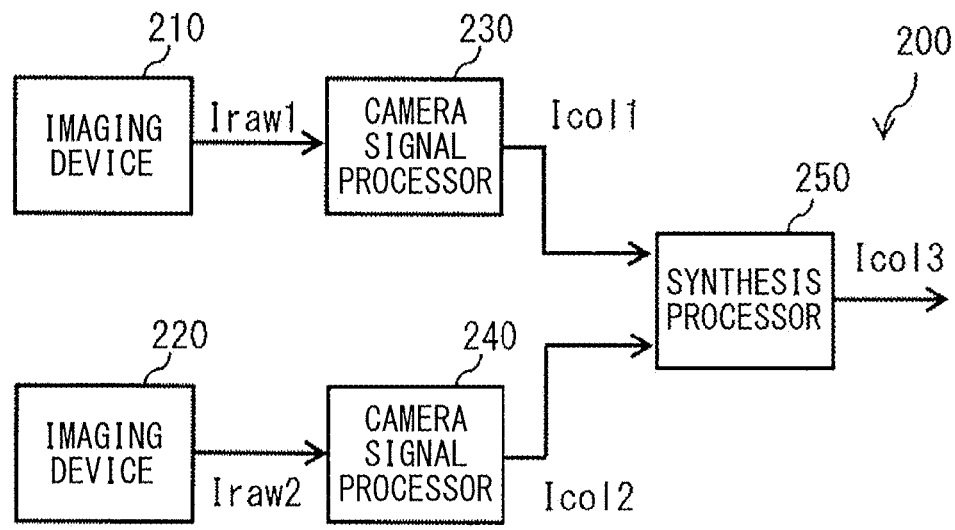

SIGNAL PROCESSING APPARATUS AND IMAGING APPARATUS

CROSS-REFERENCE TO RELATED APPLICATIONS

This application claims the benefit under 35 U.S.C. § 371 as a U.S. National Stage Entry of International Application No. PCT/JP2017/001527, filed in the Japanese Patent Office as a Receiving Office on Jan. 18, 2017, which claims priority to Japanese Patent Application Number JP2016-041718, filed in the Japanese Patent Office on Mar. 4, 2016, each of which is hereby incorporated by reference in its entirety.

TECHNICAL FIELD

The present disclosure relates to a signal processing apparatus and an imaging apparatus.

BACKGROUND ART

An imaging system that uses two imaging apparatuses to pick up an image having a wide visual field and high resolution has been proposed (e.g., see PTL 1).

CITATION LIST

Patent Literature

PTL 1: Japanese Unexamined Patent Application Publication No. 2003-134375

SUMMARY OF INVENTION

A single plate image sensor is used in a large number of still cameras, video cameras, etc. In an imaging apparatus including the single plate image sensor, RAW data (mosaic data) in which information of one of colors RGB is set for each pixel is generated, and the generated RAW data subjected to demosaic processing is outputted as image data. In the image data, each pixel is set with color information of all of RGB, and a format of the image data is a general-purpose image format such as JPEG and TIFF.

In a case where in the two imaging apparatuses disclosed in PTL 1, the single plate image sensor is used and the image data in which each pixel is set with the color information of all of RGB is outputted, the demosaic processing is performed in each of the imaging apparatuses. Further, in the invention disclosed in PTL 1, processing of synthesizing the image data subjected to the demosaic processing, with each other is performed. Therefore, an issue that a processing cost and power consumption become extremely large occurs due to a large amount of color information for each pixel. It is desirable to provide a signal processing apparatus and an imaging apparatus that make it possible to reduce the processing cost and the power consumption.

A first signal processing apparatus according to an embodiment of the present disclosure includes a positioner and a synthesizer. The positioner generates, on the basis of two pieces of RAW data different in angle of view from each other, positioning data of the two pieces of the RAW data. The synthesizer synthesizes the two pieces of the RAW data with each other on the basis of the positioning data generated by the positioner.

A first imaging apparatus according to an embodiment of the present disclosure includes two imaging devices that generate RAW data different in angle of view from each other. The first imaging apparatus further includes a positioner and a synthesizer. The positioner provided in the first imaging apparatus generates, on the basis of two pieces of the RAW data generated by the respective imaging devices, positioning data of the two pieces of the RAW data. The synthesizer provided in the first imaging apparatus synthesizes the two pieces of the RAW data with each other data on the basis of the positioning data generated by the positioner.

In the first signal processing apparatus and the first imaging apparatus according to the respective embodiments of the present disclosure, the two pieces of the RAW data different in angle of view from each other are synthesized with each other on the basis of the positioning data generated on the basis of the two pieces of the RAW data. As a result, synthesis is performed in a state of the RAW data before being subjected to demosaic processing. Therefore, an amount of color information for each pixel is less than that of the image data having been subjected to the demosaic processing, which makes it possible to suppress a calculation amount necessary for synthesis.

A second signal processing apparatus according to an embodiment of the present disclosure includes a positioner and a synthesizer. The positioner generates, on the basis of three or more pieces of RAW data different in angle of view from one another, positioning data of the three or more pieces of the RAW data. The synthesizer synthesizes the three or more pieces of the RAW data with one another on the basis of the positioning data generated by the positioner.

A second imaging apparatus according to an embodiment of the present disclosure includes three or more imaging devices that generate RAW data different in angle of view from one another. The second imaging apparatus further includes a positioner and a synthesizer. The positioner provided in the second imaging apparatus generates, on the basis of three or more pieces of the RAW data generated by the respective imaging devices, positioning data of the three or more pieces of the RAW data. The synthesizer provided in the second imaging apparatus synthesizes the three or more pieces of the RAW data with one another on the basis of the positioning data generated by the positioner.

In the second signal processing apparatus and the second imaging apparatus according to the respective embodiments of the present disclosure, the three or more pieces of the RAW data different in angle of view from one another are synthesized on the basis of the positioning data generated on the basis of the three or more pieces of the RAW data. As a result, synthesis is performed in a state of the RAW data before being subjected to demosaic processing. Therefore, an amount of color information for each pixel is less than that of the image data having been subjected to the demosaic processing, which makes it possible to suppress a calculation amount necessary for synthesis.

According to the first and second signal processing apparatuses and the first and second imaging apparatuses of the respective embodiments of the present disclosure, the synthesis is performed in a state of the RAW data before being subjected to the demosaic processing. This makes it possible to reduce the number of times of the demosaic processing to once. Further, the RAW data to be synthesized includes a less amount of color information for each pixel than that of the color image data to be synthesized in an existing technique. This makes it possible to suppress a calculation amount necessary for synthesis. Accordingly, it is possible to reduce the processing cost and the power consumption necessary for the demosaic processing and the synthesis processing. It is to be noted effects achieved by the present disclosure are not necessarily limited to the effects described here, and the present disclosure may achieve any of effects described in the present specification.

BRIEF DESCRIPTION OF DRAWINGS

FIG. 1 is a diagram illustrating an example of a schematic configuration of an imaging apparatus according to an embodiment of the present disclosure.

FIG. 2 is a diagram illustrating an example of the schematic configuration of the imaging apparatus.

FIG. 3 is a diagram illustrating an example of a functional block of the imaging apparatus in FIG. 1 and FIG. 2.

FIG. 4 is a diagram illustrating an example of a pixel array in an imaging element in FIG. 3.

FIG. 5 is a diagram illustrating an example of a concept of signal processing by a synthesis processor in FIG. 3.

FIG. 6 is a diagram illustrating an example of a functional block of the synthesis processor in FIG. 3.

FIG. 7 is a diagram illustrating an example of a signal processing procedure by the synthesis processor in FIG. 6.

FIG. 8 is a diagram illustrating an example of pixel interpolation.

FIG. 9 is a diagram illustrating an example of an interpolation filter in a case where a center pixel is a G pixel.

FIG. 10 is a diagram illustrating an example of the interpolation filter in a case where the center pixel is an R pixel or a B pixel.

FIG. 11 is a diagram illustrating an example of an internal configuration of a fusion unit in FIG. 6.

FIG. 12 is a diagram illustrating an example of the internal configuration of the fusion unit in FIG. 6.

FIG. 13 is a diagram illustrating an example of an internal configuration of a LPF unit in FIG. 6.

FIG. 14 is a diagram illustrating an example of one filter out of a plurality of LPF units that are arranged in parallel inside the LPF unit in FIG. 13.

FIG. 15 is a diagram illustrating an example of one filter out of the plurality of LPF units that are arranged in parallel inside the LPF unit in FIG. 13.

FIG. 16A is a diagram illustrating an example of correlation processing by a correlation processor in FIG. 6.

FIG. 16B is a diagram illustrating an example of the correlation processing by the correlation processor in FIG. 6.

FIG. 17 is a diagram illustrating a modification example of the schematic configuration of the imaging apparatus in FIG. 1.

FIG. 18 is a diagram illustrating a modification example of the functional block of the imaging apparatus in FIG. 1.

FIG. 19 is a diagram illustrating an example of a functional block of a synthesis processor in FIG. 18.

FIG. 20 is a diagram illustrating an example of a functional block of an existing imaging apparatus.

MODES FOR CARRYING OUT THE INVENTION

Modes for carrying out the present disclosure are described in detail below with reference to drawings. It is to be noted description is given in the following order.
1. Embodiment
2. Modification Example 1. Embodiment Configuration FIG. 1 and FIG. 2 each illustrate an example of a schematic configuration of an imaging apparatus 1 according to an embodiment of the present disclosure. The imaging apparatus 1 uses two imaging devices 10 and 20 to acquire an image having a wide angle of view and high resolution and to perform optical zooming without using a mechanical zoom mechanism.

For example, the two imaging devices 10 and 20 are disposed so as to be horizontal to each other in physical arrangement. An optical axis AX1 of the imaging device 10 and an optical axis AX2 of the imaging device 20 are parallel to each other, for example, as illustrated in FIG. 1. For example, the optical axis AX1 and the optical axis AX2 may not be parallel to each other, as illustrated in FIG. 2. At this time, the optical axis AX1 and the optical axis AX2 are preferably directed in a direction in which a distance between the optical axis AX1 and the optical axis AX2 is decreased with increasing distance from the imaging apparatus 1.

As illustrated in FIG. 1 and FIG. 2, the imaging device 20 has an imaging region R2 that is a region excluding an outer edge of an imaging region R1 of the imaging device 10. The two imaging devices 10 and 20 respectively generate RAW data Iraw1 and RAW data Iraw2 different in angle of view from each other. The imaging device 10 generates the RAW data Iraw1 (first RAW data) having a relatively wide angle of view through imaging. The imaging device 20 generates the RAW data Iraw2 (second RAW data) having an angle of view narrower than the angle of view of the RAW data Iraw1, through imaging. The RAW data Iraw1 and the RAW data Iraw2 are described in detail later.

FIG. 3 illustrates an example of a functional block of the imaging apparatus 1. The imaging apparatus 1 includes, for example, the two imaging devices 10 and 20, a signal processor 30 (signal processing apparatus), and a controller 40. The controller 40 controls the two imaging devices 10 and 20 and the signal processor 30.

[Imaging Device 10]

The imaging device 10 includes, for example, an imaging element 11 and an optical lens 12. The optical lens 12 condenses object light L1 and causes the condensed object light L1 to enter a light entrance surface of the imaging element 11. For example, the optical lens 12 is fixed in the imaging device 10. At this time, a focal length of the imaging device 10 is fixed at a constant value. The imaging device 10 may further include, for example, an iris and a variable optical LPF on the light entrance surface side of the imaging element 11. The imaging element 11 is described later.

[Imaging Device 20]

The imaging device 20 includes, for example, an imaging element 21 and an optical lens 22. The optical lens 12 condenses object light L2 and causes the condensed object light L2 to enter a light entrance surface of the imaging element 21. For example, the optical lens 22 is fixed in the imaging device 20. At this time, a focal length of the imaging device 20 is fixed at a constant value. The imaging device 20 may further include, for example, an iris and a variable optical LPF on the light entrance surface side of the imaging element 21.

[Imaging Elements 11 and 21]

Next, the imaging elements 11 and 21 are described. The imaging elements 11 and 21 each include, for example, a light receiver and a color filter array. The light receiver includes a plurality of photoelectric conversion elements that are two-dimensionally arranged at predetermined intervals. The color filter array is disposed on a light entrance surface of the light receiver. The imaging elements 11 and 21 are single plate solid-state imaging element and each include, for example, a single plate CCD (charge Coupled Device) image sensor or a single plate CMOS (Complementary Metal-Oxide Semiconductor) image sensor. In each of the imaging elements 11 and 21, the color filter array is a Bayer array including an RGB array, for example, as illustrated in FIG. 4. It is to be noted the color filter array may be, for example, an RGBW array or an array of yellow (Y), cyan (C), magenta (M), etc. It is to be noted, in the following, a case where the color filter array is the Bayer array including the RGB array is described as an example.

For example, the imaging elements 11 and 21 discretely sample, by the light receivers and the color filter arrays, the object light L1 and the object light L2 entered through the lenses 12 and 22, to generate the RAW data Iraw1 and the RAW data Iraw2. The imaging element 11 generates the RAW data Iraw1 having a relatively wide angle of view. For example, making the focal length of the imaging device 10 relatively short makes it possible to obtain the RAW data Iraw1 having the relatively wide angle of view. The imaging element 21 generates the RAW data Iraw2 having an angle of view narrower than the angle of view of the RAW data Iraw1. For example, making the focal length of the imaging device 10 relatively long makes it possible to obtain the RAW data Iraw2 having the relatively narrow angle of view.

Each of the RAW data Iraw1 and Iraw2 is mosaic data in which one kind of color information out of a plurality of kinds of color information included in the color filter array is set for each pixel. In the case where the color filter array is the Bayer array including the RGB array, each of the RAW data Iraw1 and Iraw2 is mosaic data in which one kind of color information of red information, green information, and blue information included in the color filter array is set for each pixel. To generate color image data Icol from the RAW data Iraw1 and Iraw2, demosaic processing to generate all color information for all pixels from the RAW data Iraw1 and Iraw2 is necessary. In the present embodiment, the RAW data Iraw1 and Iraw2 before being subjected to the demosaic processing are synthesized. Synthesis of the RAW data Iraw1 and Iraw2 is described in detail later.

[Signal Processor 30]

Next, description is given of the signal processor 30. The signal processor 30 includes, for example, a synthesis processor 31 and a camera signal processor 32, as illustrated in FIG. 3. The synthesis processor 31 synthesizes two pieces of RAW data Iraw1 and Iraw2 respectively generated by the imaging devices 10 and 20, thereby generating synthesized RAW data Iraw. The camera signal processor 32 performs the demosaic processing on the synthesized RAW data Iraw generated by the synthesis processor 31, thereby generating the color image data Icol. The color image data Icol includes, for example, all kinds of color information included in the color filter array for each pixel. In the case where the color filter array is the Bayer array including RGB, the color image data Icol includes, for example, the color information of RGB for each pixel.

FIG. 5 illustrates an example of a concept of the signal processing by the synthesis processor 31. In FIG. 5, the signal processing is briefly described because priority is given to understandability of the signal processing by the synthesis processor 31. Therefore, reference numerals different from the above-described reference numerals are used in FIG. 5.

The synthesis processor 31 acquires wide image data Iwide from the imaging device 10, and acquires telephoto image data Itele from the imaging device 20. An angle of view of the telephoto image data Itele is smaller than that of the wide image data Iwide. The telephoto image data Itele corresponds to a predetermined region α excluding an outer edge of the wide image data Iwide. The synthesis processor 31 sets the predetermined region α on the basis of magnification of each of the imaging devices 10 and 20 and an image size of each of the wide image data Iwide and the telephoto image data Itele.

The synthesis processor 31 clips the predetermined region α from the wide image data Iwide to generate wide image data Iwide'. The synthesis processor 31 reduces the telephoto image data Itele on the basis of the magnification of each of the imaging devices 10 and 20, to generate telephoto image data Itele'. The synthesis processor 31 synthesizes the wide image data Iwide' and the telephoto image data Itele' with each other to generate synthesized image data Ifusion. It is assumed that the magnification of the imaging device 10 is set to one time and the magnification of the imaging device 20 is set to two times. At this time, for example, in a case where the magnification specified by the user is one time, the synthesis processor 31 outputs the wide image data Iwide as the synthesized RAW data Iraw. For example, in a case where the magnification specified by the user is two or more times, the synthesis processor 31 outputs, as the synthesized RAW data Iraw, the telephoto image data Itele that has been magnified by the magnification specified by the user. For example, in a case where the magnification specified by the user is from one time to two times, the synthesis processor 31 outputs, as the synthesized RAW data Iraw, the wide image data Iwide in which the predetermined region α has been replaced with the synthesized image data Ifusion (synthesized image data Imerge).

It is to be noted, actually, positional deviation caused by parallax, sensitivity difference and exposure difference between the imaging devices 10 and 20 may be included in the wide image data Iwide' and the telephoto image data Itele. The synthesized image data Ifusion may include a high-frequency component exceeding a Nyquist frequency of each of the imaging devices 10 and 20. The wide image data Iwide' and the telephoto image data Itele' are mosaic data by definition; therefore, pixel interpolation is preferably performed on the wide image data Iwide' and the telephoto image data Itele' in order to synthesize the wide image data Iwide' and the telephoto image data Itele' with each other with high accuracy. Accordingly, the synthesis processor 31 preferably performs various kinds of signal processing described below on the wide image data Iwide' and the telephoto image data Itele'.

FIG. 6 illustrates an example of a functional block of the synthesis processor 31. FIG. 7 illustrates an example of a procedure of the signal processing by the synthesis processor 31.

The synthesis processor 31 includes a positioner 130 and a synthesizer 140. The positioner 130 generates, on the basis of two pieces of RAW data Iraw1 and Iraw2 respectively generated by the imaging devices 10 and 20, positioning data of the two pieces of RAW data Iraw1 and Iraw2. The synthesizer 140 synthesizes the two pieces of RAW data Iraw1 and Iraw2 with each other on the basis of the positioning data generated by the positioner 130.

The positioner 130 includes, for example, a clipper 131, a gain corrector 132, pixel correctors 133 and 134, a reducer 135, and a parallax calculator 136.

The clipper 131 specifies, in the RAW data Iraw1, a fusion region β (corresponding to the region α in FIG. 5) to be synthesized with the RAW data Iraw2. Specifically, the clipper 131 specifies the fusion region β on the basis of the magnification of each of the imaging devices 10 and 20 and the image size of each of the RAW data Iraw1 and Iraw2.

The clipper 131 specifies coordinates of the fusion region β in the RAW data Iraw1 on the basis of, for example, the magnification of each of the imaging devices 10 and 20 and the image size of each of the RAW data Iraw1 and Iraw2. The clipper 131 clips RAW data Iraw1a corresponding to the fusion region β from the RAW data Iraw1 on the basis of, for example, the specified coordinates (step S101).

It is to be noted the synthesis processor 31 may perform OPB (Optical Black) subtraction on the RAW data Iraw1a and the RAW data Iraw2. The OPB subtraction indicates elimination of a noise component caused by, for example, a dark current. For example, the synthesis processor 31 may eliminate, from the RAW data Iraw1a and Iraw2, a noise component generated in a case where the imaging devices 10 and 20 are shielded from light. At this time, in a case where there is a pixel having a value that becomes negative due to elimination of the noise component in the RAW data Iraw1a and Iraw2, the synthesis processor 31 holds coordinates of the pixel.

The gain corrector 132 calculates a gain ratio (e.g., RGB gain ratio) for each color information in the RAW data Iraw1a and Iraw2. For example, the gain corrector 132 calculates an average value in the RAW data Iraw1a for each color information and calculates an average value in the RAW data Iraw2 for each color information. For example, the gain corrector 132 calculates a correction gain for each color information from a ratio of the average values of the RAW data Iraw1a and Iraw2 for each color information. The gain corrector 132 corrects the RAW data Iraw2 on the basis of the calculated correction gain (step S102), thereby generating RAW data Iraw2a.

The pixel corrector 133 performs interpolation of all of the pixels included in the RAW data Iraw1a on the basis of a predetermined kind of color information (e.g., green information) included in the RAW data Iraw1a, to generate, as the positioning data, interpolated RAW data Iraw1b including the predetermined kind of color information (e.g., green information) (step S103). The pixel corrector 134 performs interpolation of all of the pixels included in the RAW data Iraw2a on the basis of the predetermined kind of color information (e.g., green information) included in the RAW data Iraw2a, to generate, as the positioning data, interpolated RAW data Iraw2b including the predetermined kind of color information (e.g., green information).

The pixel corrector 133 generates the interpolated RAW data Iraw1b including the green information, from the RAW data Iraw1a including the Bayer array of the RGB array, for example, as illustrated in FIG. 8. Further, the pixel corrector 133 generates the interpolated RAW data Iraw2b including the green information, from the RAW data Iraw2a including the Bayer array of the RGB array, for example, as illustrated in FIG. 8. At this time, in a case where a center pixel (pixel to be interpolated) is a G pixel, the pixel corrector 133 corrects the green information of the center pixel with use of, for example, an interpolation filter F illustrated in FIG. 9. Further, in a case where the center pixel (pixel to be interpolated) is an R pixel or a B pixel, the pixel corrector 133 replaces the color information of the center pixel with the green information generated with use of, for example, the interpolation filter F illustrated in FIG. 10.

The reducer 135 reduces the interpolated RAW data Iraw2b on the basis of the magnification of each of the imaging devices 10 and 20 (step S104). The parallax calculator 136 calculates parallax information Disp as the positioning data on the basis of the interpolated RAW data Iraw1b and Iraw2c (step S105). The parallax information Disp corresponds to a positional deviation amount on the image that is caused by misalignment of the position of the imaging device 10 and the position of the imaging device 20. The parallax calculator 136 generates the parallax information Disp from the interpolated RAW data Iraw1b and Iraw2c with use of, for example, a motion vector estimation method between two images.

The synthesizer 140 includes, for example, a fusion unit 141, a LPF unit 142, a correlation processor 143, a merging unit 144, and a selector 145.

The fusion unit 141 synthesizes two pieces of interpolated RAW data Iraw1b and Iraw2c to generate synthesized RAW data Iraw3a (step S106). Specifically, the fusion unit 141 synthesizes the two pieces of interpolated RAW data Iraw1b and Iraw2c on the basis of the parallax information Disp, to generate the synthesized RAW data Iraw3a.

FIG. 11 illustrates an example of an internal configuration of the fusion unit 141. The fusion unit 141 includes, for example, a LPF unit 141A, a HPF 141B, a parallax corrector 141C, and a superimposing unit 141D. The LPF unit 141A extracts a low-frequency component in the interpolated RAW data Iraw1b to generate interpolated RAW data Iraw1c. The HPF 141B extracts a high-frequency component in the interpolated RAW data Iraw2c to generate interpolated RAW data Iraw2d. The parallax corrector 141C corrects the interpolated RAW data Iraw2d on the basis of the parallax information Disp to generate interpolated RAW data Iraw2e. The superimposing unit 141D adds the interpolated RAW data Iraw2e to the interpolated RAW data Iraw1c to generate the synthesized RAW data Iraw3a.

It is to be noted, for example, as illustrated in FIG. 12, the fusion unit 141 may include a map processor 141E that performs map processing on the interpolated RAW data Iraw2e in a case where the interpolated RAW data Iraw2e is added to the interpolated RAW data Iraw1c. As a map, for example, a part where fusion failure easily occurs is detected from a fusion result, an input signal, and the parallax information Disp, and fusion reliability is generated. A fusion effect at a part where the reliability is low is weakened with use of the map, which causes fusion failure in a final result to become less detectable. Further, the map may be used in order to smooth variation of the resolution at a boundary between RAW data Iraw3c generated by the correlation processor 143 described later and the RAW data Iraw1 in a case where the RAW data Iraw3c and the RAW data Iraw1 are synthesized with each other. In this case, the map has a shape that weakens the fusion effect in a stepwise manner toward an outer edge of the synthesized data.

The LPF unit 142 attenuates the high-frequency component exceeding the Nyquist frequency of each of the imaging devices 10 and 20, included in the synthesized RAW data Iraw3a, to generate synthesized RAW data Iraw3b (step S107). As a result, occurrence of false color is suppressed. FIG. 13 illustrates an example of an internal configuration of the LPF unit 142. The LPF unit 142 has a configuration in which, for example, a plurality of LPFs different in cutoff frequency from one another are arranged in parallel to one another. The LPF unit 142 includes, for example, a first path P1 configured by series connection of a LPF 142A and a gain unit 142D, a second path P2 configured by series connection of a LPF 142B and a gain unit 142E, and a third path P3 provided with only a gain unit 142C. For example, as illustrated in FIG. 14, the LPF 142A uses a Nyquist frequency Nyq1 of the imaging device 10 as the cutoff frequency and has filter characteristics in which an attenuation rate is increased as approaching the cutoff frequency. For example, as illustrated in FIG. 15, the LPF 142B uses, as the cutoff frequency, a frequency between the Nyquist frequency Nyq1 of the imaging device 10 and a Nyquist frequency Nyq2 of the imaging device 20, and has filter characteristics in which an attenuation rate is increased as approaching the cutoff frequency. As a result, in the LPF unit 142, a level of the attenuation at the high frequencies is adjustable through selection of the LPF unit 142A or the LPF 142B.

The first path P1, the second path P2, and the third path P3 are coupled in parallel to one another. The LPF unit 142 is configured such that gains of the respective gain units 142C, 142D, and 142E are independently set in accordance with a control signal from the controller 40. Accordingly, for example, in a case where the control signal is provided to the LPF unit 142 so as to cause the gain of each of the gain units 142C and 142D to become zero and so as to cause the gain of the gain unit 142E to become one, the LPF unit 142 functions as the LPF unit 142B. Further, for example, in a case where the control signal is provided to the LPF unit 142 so as to cause the gain of the gain unit 142C to become zero and so as to cause the gain of each of the gain units 142D and 142E to become one, the LPF unit 142 functions as the LPF units 142A and 142B that are disposed in parallel to each other.

The correlation processor 143 performs correlation processing on the synthesized RAW data Iraw3a or the synthesized RAW data Iraw3a that has been subjected to the predetermined processing (synthesized RAW data Iraw3b) (step S108). For example, as illustrated in FIG. 16A, the correlation processor 143 adds, to the synthesized RAW data Iraw3a or the synthesized RAW data Iraw3b, a color difference component (Iraw1-Iraw1b) that is a difference between the RAW data Iraw1 and the interpolated RAW data Iraw1b. A color ratio may be used in the correlation processing. For example, as illustrated in FIG. 16B, the correlation processor 143 may multiply the synthesized RAW data Iraw3a or the synthesized RAW data Iraw3b by a color ratio component (Iraw1/Iraw1b) that is a ratio of the RAW data Iraw1 and the interpolated RAW data Iraw1b. As a result, the correlation processor 143 generates the RAW data Iraw3c (third RAW data) including an array that corresponds to the array of the RAW data Iraw1 and Iraw2.

The merging unit 144 synthesizes the RAW data Irawa1 and the RAW data Iraw3c with each other to generate RAW data Iraw3d (fourth RAW data) for demosaic processing (step S109). At this time, the merging unit 144 provides a frame-shaped region having color information of zero, in a peripheral edge of the RAW data Iraw3c, to make an image size of the RAW data Iraw3c equal to an image size of the RAW data Irawa1. Subsequently, the merging unit 144 sets, for example, the color information of the fusion region α in the RAW data Irawa1 to zero. Further, for example, the merging unit 144 adds, to the RAW data Irawa1, the RAW data Iraw3c, the image size of which has been made equal to the image size of the RAW data Irawa1. In other words, for example, the merging unit 144 replaces the fusion region α in the RAW data Irawa1 with the RAW data Iraw3c.

It is to be noted, in the case where the synthesis processor 31 performs the OPB subtraction, the merging unit 144 may add, to the RAW data Iraw3c, the noise component eliminated in the OPB subtraction in consideration of a symbol before the synthesis processing.

The selector 145 selects the synthesized RAW data Iraw to be outputted, in accordance with the magnification specified by the user. It is assumed that the magnification of the imaging device 10 is set to one time, and the magnification of the imaging device 20 is set to two times. At this time, for example, in a case where the magnification specified by the user is one time, the selector 145 outputs the RAW data Iraw1 as the synthesized RAW data Iraw. For example, in a case where the magnification specified by the user is two or more times, the synthesis processor 31 outputs, as the synthesized RAW data Iraw, the RAW data Iraw2 that has been magnified by the magnification specified by the user. For example, in a case where the magnification specified by the user is from one time to two times, the synthesis processor 31 outputs the RAW data Iraw3d as the synthesized RAW data Iraw.

[Effects]

Next, effects achieved by the imaging apparatus 1 are described.

FIG. 20 illustrates an example of a functional block of an existing imaging apparatus 200. The imaging apparatus 200 includes two imaging devices 210 and 220. The imaging apparatus 200 includes a camera signal processor 230 and a camera signal processor 240. The camera signal processor 230 converts the RAW data Iraw1 obtained by the imaging device 210, into color image data Icol1. The camera signal processor 240 converts the RAW data Iraw2 obtained by the imaging device 220, into color image data Icol2. The imaging apparatus 200 further synthesizes the color image data Icol1 and Icol2 obtained by the camera signal processors 230 and 240, to generate color image data Icol3. As described above, in the existing imaging apparatus 200, color imaging (demosaic processing) is performed in each of the imaging devices 210 and 220, and image synthesis is performed after the color imaging (demosaic processing) is performed. Therefore, an issue that a processing cost and power consumption are extremely increased occurs due to a large amount of color information for each pixel.

In contrast, in the present embodiment, the two pieces of RAW data Iraw1 and Iraw2 different in angle of view from each other are synthesized with each other on the basis of the positioning data generated on the basis of the two pieces of RAW data Iraw1 and Iraw2. In other words, in the present embodiment, synthesis is performed in the state of the RAW data before being subjected to the demosaic processing. This makes it possible to reduce the number of times of the demosaic processing to once. Further, the RAW data Iraw1 and Iraw2 to be synthesized in the present embodiment include a less amount of color information for each pixel than that of the color image data Icol1 and Icol2 to be synthesized in an existing technique. This makes it possible to suppress a calculation amount necessary for synthesis. Accordingly, it is possible to reduce the processing cost and the power consumption necessary for the demosaic processing and the synthesis processing.

Moreover, in the present embodiment, the RAW data Iraw is outputted from the synthesis processor 31. Therefore, the former camera signal processor 230 or the like may be used for the camera signal processor 32 subsequent to the synthesis processor 31 without adding any modification. In other words, in the present embodiment, a configuration in which processing subsequent to the demosaic processing with respect to RAW output of a single imaging device is not modified at all is applicable to the camera signal processor 32. Accordingly, in the present embodiment, it is possible to reduce the processing cost and the power consumption necessary for the demosaic processing and the synthesis processing with easiness similar to a case where the single imaging device is used.

Further, in the present embodiment, the region excluding the outer edge of the imaging region R1 of the imaging device 10 corresponds to the imaging region R2 of the imaging device 20. Furthermore, in the present embodiment, the RAW data Iraw1 having a relatively wide angle of view and the RAW data Iraw2 having an angle of view narrower than that of the RAW data Iraw1 are generated by the imaging devices 10 and 20. Therefore, the predetermined region (fusion region β) excluding the outer edge of the synthesized RAW data Iraw and the RAW data Iraw2 are synthesized with each other. In other words, the RAW data Iraw2 is fitted into the frame-shaped RAW data Iraw1. As a result, it is possible to obtain an image having a wide angle of view and high resolution with use of the two imaging devices 10 and 20, and to perform optical zooming without using a mechanical zoom mechanism.

Further, in the present embodiment, interpolation of all of the pixels included in the RAW data Iraw1 and Iraw2 is performed on the basis of the predetermined kind of color information included in the RAW data Iraw1 and Iraw2. This makes it possible to perform synthesis processing with accuracy substantially equal to accuracy in the synthesis processing that is performed after the demosaic processing is performed on the RAW data Iraw1 and Iraw2.

Further, in the present embodiment, the parallax information Disp as the positioning data is generated on the basis of the two pieces of interpolated RAW data Iraw1b and Iraw2b that are generated from the two pieces of RAW data Iraw1 and Iraw2. Therefore, using the parallax information Disp allows for enhancement of synthesis accuracy of the interpolated RAW data Iraw1b and the interpolated RAW data Iraw2c.

Further, in the present embodiment, the high-frequency component exceeding the Nyquist frequency of each of the imaging devices 10 and 20, included in the synthesized RAW data Iraw3a is attenuated by the LPF 142. This makes it possible to suppress occurrence of false color in a case where the RAW data Irawa1 and the RAW data Iraw3c are synthesized with each other. Furthermore, in the present embodiment, the LPF unit 142A and the LPF 142B are arranged in parallel, and it is possible to select one of the LPF unit 142A and the LPF 142B. This makes it possible to adjust the level of the attenuation at high frequencies through selection of the LPF unit 142A or the LPF 142B.

Further, in the present embodiment, the color difference component (Iraw1-Iraw1b) is added to the synthesized RAW data Iraw3c or the synthesized RAW data Iraw3a that has been subjected to the predetermined processing (synthesized RAW data Iraw3b). As described above, in the present embodiment, lost color information is returned to the synthesized RAW data Iraw3c or the synthesized RAW data Iraw3b after the synthesis processing with a less amount of color information is performed. Accordingly, in the present embodiment, it is possible to enhance synthesis accuracy while reducing the processing cost and the power consumption necessary for the synthesis processing.

Further, in the present embodiment, the demosaic processing is performed on the RAW data Iraw3d that is generated by synthesizing the RAW data Iraw1 and the RAW data Iraw3c with each other. As described above, in the present embodiment, the demosaic processing is performed after synthesis of the RAW data is performed, thus making it possible to reduce the processing cost and the power consumption as compared with a case where the synthesis is performed after the demosaic processing is performed.

2. Modification Example

Next, a modification example of the imaging apparatus 1 according to the above-described embodiment is described.

The imaging apparatus 1 includes the two imaging devices 10 and 20 in the above-described embodiment; however, the imaging apparatus 1 may include three or more imaging devices. For example, as illustrated in FIG. 17 and FIG. 18, the imaging apparatus 1 may include three imaging devices 10, 20, and 50. For example, the three imaging devices 10, 20, and 50 are disposed so as to be horizontal to one another in physical arrangement. The optical axis AX1 of the imaging device 10, the optical axis AX2 of the imaging device 20, and an optical axis AX3 of the imaging device 50 are not parallel to one another, for example, as illustrated in FIG. 17. At this time, the optical axes AX1, AX2, and AX3 are preferably directed in a direction in which gaps of the optical axes AX1, AX2, and AX3 are mutually decreased with increasing distance from the imaging apparatus 1. The optical axes AX1, AX2, and AX3 may be parallel to one another.

In the present modification example, the positioner 130 generates, on the basis of three or more pieces of RAW data Iraw1, Iraw2, and Iraw4 generated by the imaging devices 10 and 20, positioning data of the three or more pieces of RAW data Iraw1, Iraw2, and Iraw4. The synthesizer 140 synthesizes the three or more pieces of RAW data Iraw1, Iraw2, and Iraw4 with one another on the basis of the positioning data generated by the positioner 130.

In the present modification example, the imaging device 20 has, as the imaging region R2, the region excluding the outer edge of the imaging region R1 of the imaging device 10. The imaging device 50 includes an imaging element 51 and an optical lens 52, and has, as an imaging region R3, a region excluding an outer edge of the imaging region R2 of the imaging device 20. The three imaging devices 10, 20, and 30 respectively generate the RAW data Iraw1, Iraw2, and Iraw4 different in angle of view from one another. The imaging device 10 generates the RAW data Iraw1 (first RAW data) having a widest angle of view through imaging. The imaging device 20 generates the RAW data Iraw2 (second RAW data) having an angle of view narrower than that of the RAW data Iraw1, through imaging. The imaging device 30 generates the RAW data Iraw4 (third RAW data) having an angle of view narrower than that of the RAW data Iraw2, through imaging.

In the present modification example, the synthesis processor 31 synthesizes the predetermined region excluding the outer edge of the RAW data Iraw1 and the RAW data Irawa2, and synthetizes the predetermined region excluding the outer edge of the RAW data Irawa2 and the RAW data Iraw4.

FIG. 19 illustrates an example of the functional block of the synthesis processor 31 according to the present modification example. In the present modification example, the positioner 130 includes a signal processing block for the RAW data Iraw3, for example, a gain corrector 137, a pixel corrector 138, and a reducer 139.

The gain corrector 137 calculates a gain ratio (e.g., RGB gain ratio) for each color information in the RAW data Iraw2 and Iraw3. For example, the gain corrector 137 calculates an average value in the RAW data Iraw2 for each color information and calculates an average value in the RAW data Iraw3 for each color information. For example, the gain corrector 137 calculates a correction gain for each color information from a ratio of the average values of the RAW data Iraw2 and Iraw3 for each color information. The gain corrector 137 corrects the RAW data Iraw3 on the basis of the calculated correction gain, thereby generating RAW data Iraw4a.

The pixel corrector 138 performs interpolation of all of the pixels included in the RAW data Iraw4a on the basis of a predetermined kind of color information (e.g., green information) included in the RAW data Iraw4a, to generate, as the positioning data, interpolated RAW data Iraw4b including the predetermined kind of color information (e.g., green information). The pixel corrector 138 performs interpolation of all of the pixels included in the RAW data Iraw4a on the basis of the predetermined kind of color information (e.g., green information) included in the RAW data Iraw4a, to generate, as the positioning data, the interpolated RAW data Iraw4b including the predetermined kind of color information (e.g., green information).

The pixel corrector 138 generates the interpolated RAW data Iraw4b including the green information, from the RAW data Iraw4a including the Bayer array of the RGB array, for example, as illustrated in FIG. 8. At this time, in a case where a center pixel (pixel to be interpolated) is a G pixel, the pixel corrector 138 corrects the green information of the center pixel with use of, for example, the interpolation filter F illustrated in FIG. 9. Further, in a case where the center pixel (pixel to be interpolated) is an R pixel or a B pixel, the pixel corrector 133 replaces the color information of the center pixel with the green information generated with use of, for example, the interpolation filter F illustrated in FIG. 10.

The reducer 139 reduces the interpolated RAW data Iraw4b on the basis of the magnification of each the imaging devices 20 and 30. The parallax calculator 136 calculates the parallax information Disp as the positioning data on the basis of the interpolated RAW data Iraw1b, Iraw2c, and Iraw4c. The parallax information Disp corresponds to a positional deviation amount on the image that is caused by misalignment of the position of the imaging device 10 and the position of the imaging device 20 and a positional deviation amount on the image that is caused by misalignment of the position of the imaging device 20 and the position of the imaging device 30. The parallax calculator 136 generates the parallax information Disp from the interpolated RAW data Iraw1b, Iraw2c, and Iraw4c with use of, for example, a motion vector estimation method between two images.

In the present modification example, the fusion unit 141 synthesizes the two pieces of interpolated RAW data Iraw1b and Iraw2c and synthesizes the two pieces of interpolated RAW data Iraw2c and Iraw4c, thereby generating the synthesized RAW data Iraw3a. Specifically, the fusion unit 141 synthesizes the two pieces of interpolated RAW data Iraw1b and Iraw2c and synthesizes the two pieces of interpolated RAW data Iraw2c and Iraw4c on the basis of the parallax information Disp, thereby generating the synthesized RAW data Iraw3a.

In the present modification example, the two pieces of RAW data Iraw1 and Iraw2 different in angle of view from each other are synthesized on the basis of the positioning data generated on the basis of the two pieces of RAW data Iraw1 and Iraw2. Further, the two pieces of RAW data Iraw2 and Iraw4 different in angle of view from each other are synthesized on the basis of the positioning data generated on the basis of the two pieces of RAW data Iraw2 and Iraw4. In other words, in the present embodiment, synthesis is performed in the state of the RAW data before being subjected to the demosaic processing. This makes it possible to reduce the number of times of the demosaic processing. Further, the RAW data Iraw1, Iraw2, and Iraw4 to be synthesized in the present embodiment include a less amount of color information for each pixel than that of the color image data to be synthesized in the existing technique. Accordingly, it is possible to reduce the processing cost and the power consumption necessary for the demosaic processing and the synthesis processing.

Further, in the present modification example, the region excluding the outer edge of the imaging region R1 of the imaging device 10 corresponds to the imaging region R2 of the imaging device 20, and the region excluding the outer edge of the imaging region R2 of the imaging device 20 corresponds to the imaging region R3 of the imaging device 50. Moreover, in the present modification example, the RAW data Iraw1 having a relatively wide angle of view, the RAW data Iraw2 having an angle of view narrower than that of the RAW data Iraw1, and the RAW data Iraw4 having an angle of view narrower than that of the RAW data Iraw2 are generated by the imaging devices 10, 20, and 50. Accordingly, the predetermined region (fusion region β) excluding the outer edge of the synthesized RAW data Iraw and the RAW data Iraw2 are synthesized with each other. Furthermore, the predetermined region excluding the outer edge of the RAW data Iraw2 and the RAW data Iraw4 are synthesized with each other. In other words, the RAW data Iraw2 is fitted into the frame-shaped RAW data Iraw1, and the RAW data Iraw4 is fitted into the frame-shaped RAW data Iraw2. As a result, it is possible to obtain an image having a wide angle of view and high resolution with use of the three imaging devices 10, 20, and 50, and to perform optical zooming without using a mechanical zoom mechanism.

Although the present disclosure has been described with reference to the embodiment and the modification example thereof, the present disclosure is not limited to the above-described embodiment and the like and may be variously modified. It is to be noted the effects described in the present specification are merely examples. The effects achieved by the present disclosure are not limited to the effects described in the present specification. The present disclosure may achieve effects other than the effects described in the present specification.

Further, the present disclosure may have the following configurations.

(1)

An imaging apparatus, including:

two imaging devices that generate RAW data different in angle of view from each other;

a positioner that generates, on the basis of two pieces of the RAW data generated by the respective imaging devices, positioning data of the two pieces of the RAW data; and a synthesizer that synthesizes the two pieces of the RAW data with each other on the basis of the positioning data generated by the positioner.

(2)

The imaging apparatus according to (1), in which the two pieces of the RAW data include first RAW data having a relatively wide angle of view and second RAW data having an angle of view narrower than the angle of view of the first RAW data, a first imaging device that is one of the two imaging devices generates the first RAW data through imaging, and a second imaging device that is the other of the two imaging devices has, as an imaging region, a region excluding an outer edge of an imaging region of the first imaging device, and generates the second RAW data through imaging.

(3)

The imaging apparatus according to (2), in which the synthesizer synthesizes a predetermined region excluding the outer edge of the first RAW data and the second RAW data with each other.

(4)

The imaging apparatus according to any one of (1) to (3), in which the positioner performs interpolation of all of pixels included in the RAW data on the basis of a predetermined kind of color information included in the RAW data, to generate, as the positioning data, interpolated RAW data including the predetermined kind of color information.

(5)

The imaging apparatus according to (4), in which the positioner generates parallax information as the positioning data on the basis of two pieces of the interpolated RAW data generated from the two pieces of the RAW data.

(6)

The imaging apparatus according to (5), in which the synthesizer synthesizes the two pieces of the interpolated RAW data on the basis of the parallax information to generate synthesized RAW data.

(7)

The imaging apparatus according to (6), in which the synthesizer attenuates a high-frequency component exceeding a Nyquist frequency of each of the imaging devices, included in the synthesized RAW data.

(8)

The imaging apparatus according to (4), in which the synthesizer synthesizes two pieces of the interpolated RAW data to generate synthesized RAW data, and thereafter, attenuates a high-frequency component exceeding a Nyquist frequency of each of the imaging devices, included in the synthesized RAW data.

(9)

The imaging apparatus according to (4), in which the synthesizer adds a color difference component to the synthesized RAW data or the synthesized RAW data having been subjected to predetermined processing, or multiplies the synthesized RAW data or the synthesized RAW data having been subjected to predetermined processing by a color ratio component, to generate third RAW data that includes an array corresponding to an array of the RAW data, the color difference component being a difference between the first RAW data and the interpolated RAW data generated from the first RAW data, and the color ratio component being a ratio of the first RAW data and the interpolated RAW data.

(10)

The imaging apparatus according to (9), in which the synthesizer synthesizes the first RAW data and the third RAW data with each other to generate fourth RAW data for demosaic processing.

(11)

The imaging apparatus according to (10), further including a camera signal processor that performs demosaic processing on the fourth RAW data.

(12)

An imaging apparatus, including:

three or more imaging devices that generate RAW data different in angle of view from one another;

a positioner that generates, on the basis of three or more pieces of the RAW data generated by the respective imaging devices, positioning data of the three or more pieces of the RAW data; and a synthesizer that synthesizes the three or more pieces of the RAW data with one another on the basis of the positioning data generated by the positioner.

(13)

The imaging apparatus according to (12), in which the three or more pieces of the RAW data include first RAW data having a widest angle of view, second RAW data having an angle of view narrower than the angle of view of the first RAW data, and third RAW data having an angle of view narrower than the angle of view of the second RAW data, a first imaging device that is one of the three or more imaging devices includes a first imaging element that generates the first RAW data through imaging, a second imaging device that is different from the first imaging device out of the three or more imaging devices has, as an imaging region, a region excluding an outer edge of an imaging region of the first imaging device, and generates the second RAW data through imaging, and a third imaging device that is different from the first imaging device and the second imaging device out of the three or more imaging devices has, as an imaging region, a region excluding an outer edge of the imaging region of the second imaging device, and generates the third RAW data through imaging.

(14)

The imaging apparatus according to (13), in which the synthesizer synthesizes a predetermined region excluding the outer edge of the first RAW data and the second RAW data, and synthesizes a predetermined region excluding the outer edge of the second RAW data and the third RAW data.

(15)

A signal processing apparatus, including:

a positioner that generates, on the basis of two pieces of RAW data different in angle of view from each other, positioning data of the two pieces of the RAW data; and a synthesizer that synthesizes the two pieces of the RAW data with each other on the basis of the positioning data generated by the positioner.

(16)

The signal processing apparatus according to (15), in which the two pieces of the RAW data include first RAW data having a relatively wide angle of view and second RAW data having an angle of view narrower than the angle of view of the first RAW data, and the synthesizer synthesizes a predetermined region excluding an outer edge of the first RAW data and the second RAW data with each other.

(17)

A signal processing apparatus, including:

a positioner that generates, on the basis of three or more pieces of RAW data different in angle of view from one another, positioning data of the three or more pieces of the RAW data; and a synthesizer that synthesizes the three or more pieces of the RAW data with one another on the basis of the positioning data generated by the positioner.

(18)

The signal processing apparatus according to (17), in which the three or more pieces of the RAW data include first RAW data having a widest angle of view, second RAW data having an angle of view narrower than the angle of view of the first RAW data, and third RAW data having an angle of view narrower than the angle of view of the second RAW data, and the synthesizer synthesizes a predetermined region excluding an outer edge of the first RAW data and the second RAW data, and synthesizes a predetermined region excluding an outer edge of the second RAW data and the third RAW data.

This application is based upon and claims the benefit of priority of the Japanese Patent Application No. 2016-041718 filed with the Japan Patent Office on Mar. 4, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging apparatus, comprising:
two imaging devices that generate RAW data different in angle of view from each other; and
synthesis processor circuitry configured to:
generate, on a basis of two pieces of the RAW data generated by the respective imaging devices, positioning data of the two pieces of the RAW data; and
synthesize the two pieces of the RAW data with each other on a basis of the positioning data to generate synthesized RAW data for subsequent demosaic processing of the synthesized RAW data obtained by synthesizing the two pieces of RAW data generated by the two imaging devices.

2. The imaging apparatus according to claim 1, wherein the two pieces of the RAW data include first RAW data having a relatively wide angle of view and second RAW data having an angle of view narrower than the angle of view of the first RAW data,
a first imaging device that is one of the two imaging devices generates the first RAW data through imaging, and
a second imaging device that is the other of the two imaging devices has, as an imaging region, a region excluding an outer edge of an imaging region of the first imaging device, and generates the second RAW data through imaging.

3. The imaging apparatus according to claim 2, wherein the synthesis processor circuitry is configured to synthesize a predetermined region excluding the outer edge of the first RAW data and the second RAW data with each other.

4. The imaging apparatus according to claim 2, wherein synthesis processor circuitry is configured to perform interpolation of all of pixels included in the RAW data on a basis of a predetermined kind of color information included in the RAW data, to generate, as the positioning data, interpolated RAW data including the predetermined kind of color information.

5. The imaging apparatus according to claim 4, wherein the synthesis processor circuitry is configured to generate parallax information as the positioning data on a basis of two pieces of the interpolated RAW data generated from the two pieces of the RAW data.

6. The imaging apparatus according to claim 5, wherein the synthesis processor circuitry is configured to synthesize the two pieces of the interpolated RAW data on a basis of the parallax information to generate synthesized RAW data.

7. The imaging apparatus according to claim 6, wherein the synthesis processor circuitry is configured to attenuate a high-frequency component exceeding a Nyquist frequency of each of the imaging devices, included in the synthesized RAW data.

8. The imaging apparatus according to claim 4, wherein the synthesis processor circuitry is configured to synthesize two pieces of the interpolated RAW data to generate synthesized RAW data, and thereafter, attenuates a high-frequency component exceeding a Nyquist frequency of each of the imaging devices, included in the synthesized RAW data.

9. The imaging apparatus according to claim 4, wherein the synthesis processor circuitry is configured to add a color difference component to the synthesized RAW data or the synthesized RAW data having been subjected to predetermined processing, or to multiply the synthesized RAW data or the synthesized RAW data having been subjected to predetermined processing by a color ratio component, to generate third RAW data that includes an array corresponding to an array of the RAW data, the color difference component being a difference between the first RAW data and the interpolated RAW data generated from the first RAW data, and the color ratio component being a ratio of the first RAW data and the interpolated RAW data.

10. The imaging apparatus according to claim 9, wherein the synthesis processor circuitry is configured to synthesize the first RAW data and the third RAW data with each other to generate fourth RAW data for demosaic processing.

11. The imaging apparatus according to claim 10, further comprising a camera signal processor that performs demosaic processing on the fourth RAW data.

12. An imaging apparatus, comprising:
three or more imaging devices that generate RAW data different in angle of view from one another; and
synthesis processor circuitry configured to:
generate, on a basis of three or more pieces of the RAW data generated by the respective imaging devices, positioning data of the three or more pieces of the RAW data; and
synthesize the three or more pieces of the RAW data with one another on a basis of the positioning data to generate synthesized RAW data for subsequent demosaic processing of the synthesized RAW data obtained by synthesizing the three or more pieces of RAW data generated by the three or more imaging devices.

13. The imaging apparatus according to claim 12, wherein the three or more pieces of the RAW data include first RAW data having a widest angle of view, second RAW data having an angle of view narrower than the angle of view of the first RAW data, and third RAW data having an angle of view narrower than the angle of view of the second RAW data,
a first imaging device that is one of the three or more imaging devices includes a first imaging element that generates the first RAW data through imaging,
a second imaging device that is different from the first imaging device out of the three or more imaging devices has, as an imaging region, a region excluding an outer edge of an imaging region of the first imaging device, and generates the second RAW data through imaging, and
a third imaging device that is different from the first imaging device and the second imaging device out of the three or more imaging devices has, as an imaging region, a region excluding an outer edge of the imaging region of the second imaging device, and generates the third RAW data through imaging.

14. The imaging apparatus according to claim 13, wherein the synthesis processor circuitry is configured to synthesize a predetermined region excluding the outer edge of the first RAW data and the second RAW data, and to synthesize a predetermined region excluding the outer edge of the second RAW data and the third RAW data.

15. A signal processing apparatus, comprising:
synthesis processor circuitry configured to:
  generate, on a basis of two pieces of RAW data different in angle of view from each other, positioning data of the two pieces of the RAW data; and
  synthesize the two pieces of the RAW data with each other on a basis of the positioning data to generate synthesized RAW data for subsequent demosaic processing of the synthesized RAW data obtained by synthesizing the two pieces of RAW data.

16. The signal processing apparatus according to claim 15, wherein
the two pieces of the RAW data include first RAW data having a relatively wide angle of view and second RAW data having an angle of view narrower than the angle of view of the first RAW data, and
the synthesis processor circuitry is configured to synthesize a predetermined region excluding an outer edge of the first RAW data and the second RAW data with each other.

17. A signal processing apparatus, comprising:
signal processor circuitry configured to:
  generate, on a basis of three or more pieces of RAW data different in angle of view from one another, positioning data of the three or more pieces of the RAW data; and
  synthesize the three or more pieces of the RAW data with one another on a basis of the positioning data to generate synthesized RAW data for subsequent demosaic processing of the synthesized RAW data obtained by synthesizing the three or more pieces of RAW data.

18. The signal processing apparatus according to claim 17, wherein
the three or more pieces of the RAW data include first RAW data having a widest angle of view, second RAW data having an angle of view narrower than the angle of view of the first RAW data, and third RAW data having an angle of view narrower than the angle of view of the second RAW data, and
the synthesis processor circuitry is configured to synthesize a predetermined region excluding an outer edge of the first RAW data and the second RAW data, and to synthesize a predetermined region excluding an outer edge of the second RAW data and the third RAW data.

* * * * *